July 22, 1958 R. B. JACQUES 2,844,791
MICRO WAVE POWER MEASURING INSTRUMENT
Filed March 4, 1952
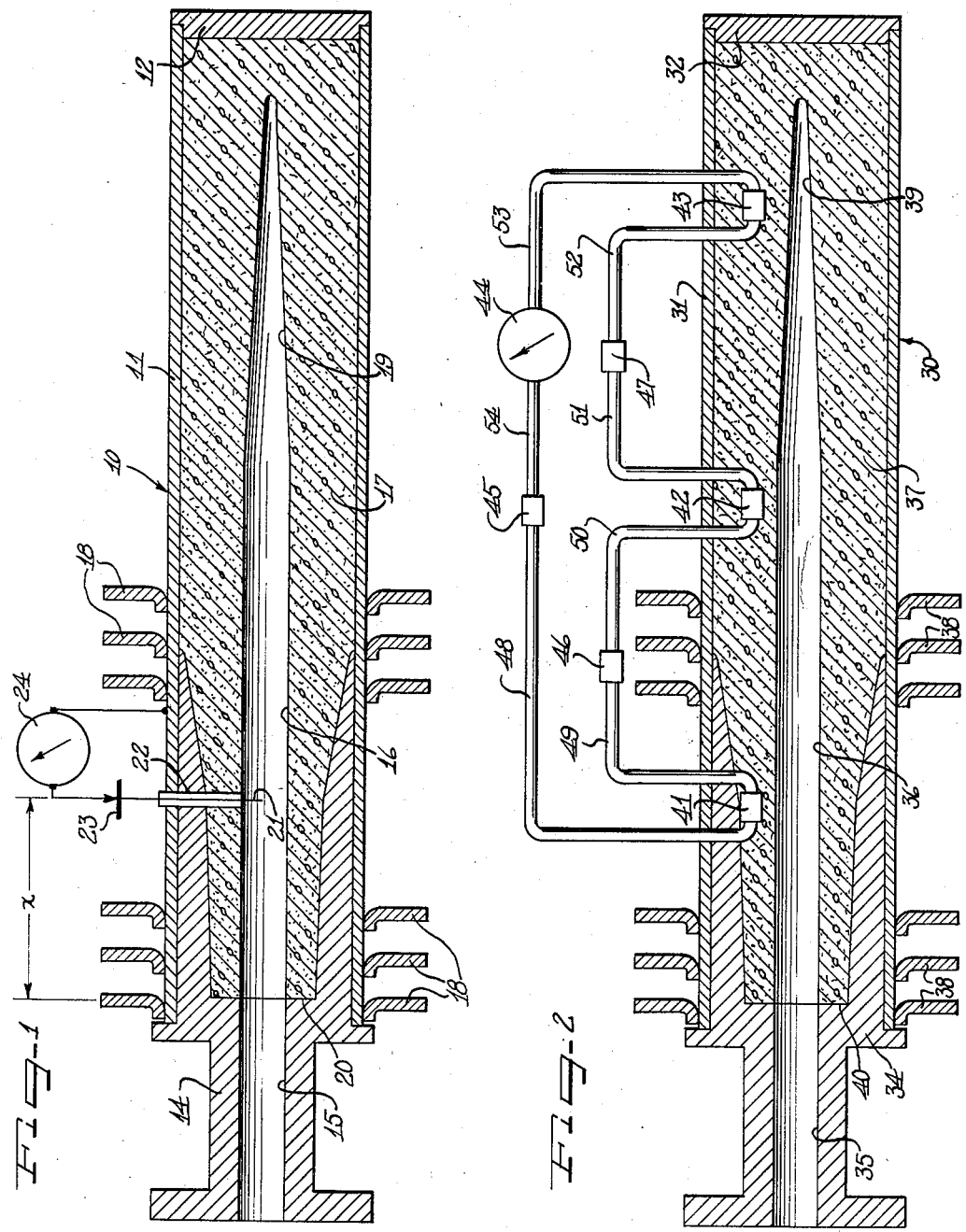
Inventor
Robert B. Jacques

United States Patent Office 2,844,791
Patented July 22, 1958

2,844,791

MICRO WAVE POWER MEASURING INSTRUMENT

Robert B. Jacques, Columbus, Ohio, assignor to Thompson Products, Inc., Cleveland, Ohio, a corporation of Ohio Application March 4, 1952, Serial No. 274,800

2 Claims. (Cl. 324—95)

This invention relates to a micro wave power measuring instrument and more particularly to an instrument for accurately measuring micro wave power with a minimum of reflection of the micro wave energy.

According to this invention, a member of lossy material is arranged to absorb high frequency electromagnetic energy and convert the energy into heat therewithin for dissipation to the atmosphere. Means for measuring the energy absorbed by the lossy member is preferably disposed at a point along the member spaced from the high-frequency electromagnetic energy-receiving end thereof. The lossy material between the receiving end and the measuring means serves to attenuate the electromagnetic energy up to the measuring means and also serves to attenuate reflections of energy back from the measuring means so that a minimum of energy is reflected back from the receiving end of the member.

One embodiment of this invention takes the form of a wave guide dummy load in which a member of lossy material has an internal opening extending from one end thereof, the member being arranged to receive high frequency electromagnetic energy into the opening, and the energy being converted into heat by the lossy material. A probe extends into the opening at a distance from the one end of the member and may, for example, be connected through a germanium crystal detector to a D.-C. voltmeter to measure the electric field within the opening. The lossy material between the one end of the member and the probe serves to attenuate energy up to the probe and also serves to attenuate reflections back from the probe so that reflection of energy from the one end of the member will be minimized.

Another embodiment of this invention again takes the form of a wave guide dummy load with a member of lossy material having an energy-receiving internal opening therein. In place of a probe extending within the opening, one or more unions of dissimilar metals are located within the lossy material. The unions of dissimilar metals develop electric potentials which are a function of the temperature of the union or junction. The unions may be connected to a D.-C. meter which will indicate the temperature of the unions and, in turn, the power received by the lossy member.

By this invention, the union or unions of dissimilar metals are located a distance from the energy-receiving end of the member, the material between the receiving end and the unions serving to attenuate high frequency electromagnetic energy up to the unions and also to attenuate reflections of energy back from the unions so that there will be a minimum of energy reflected back from the receiving end of the member.

According to a further feature of this invention, unions or junctions of dissimilar metals corresponding to the unions or junctions within the lossy member are located in the atmosphere and are connected in series opposed relation with respect to the unions or junctions within the member. A series connected D.-C. meter may then indicate the difference in potential between the internal and the external junctions and will indicate the power received by the lossy member. The potentials developed by the external unions vary with varying ambient temperature to compensate for variations in the potentials developed by the internal unions due to variations in ambient temperature and corresponding variations in the internal temperature of the member so that the effect of variations in ambient temperature on the relation between power input to the lossy member and the potential difference of the unions or junctions is minimized.

An object of this invention, accordingly, is to provide a micro wave power measuring instrument having a minimum of energy reflected therefrom.

Another object of this invention is to provide a micro wave power measuring instrument which accurately measures the power input to a dummy load regardless of variations in ambient temperature.

A further object of this invention is to provide a micro wave power measuring instrument which is accurate and yet is simply and economically manufacturable.

This invention contemplates other objects, features and advantages which will become more fully apparent from the following detailed description taken in conjunction with the accompanying drawings which illustrate preferred embodiments and in which:

Figure 1 is a cross-sectional view through a wave guide dummy load with a probe extending into an opening therewithin at a distance from the energy-receiving end thereof, according to the principles of this invention; and Figure 2 is a cross-sectional view of a wave guide dummy load having junctions of dissimilar metals embedded in the lossy material thereof at a distance from the energy-receiving end thereof and having series opposed connected junctions of dissimilar metals in the external atmosphere, according to principles of this invention.

As shown in Figure 1, a wave guide dummy load generally designated by reference numeral 10 includes an outer metallic shell 11 having a closure 12 at one end and a wave guide connector 14 seated within the other end thereof. The connector 14 has an internal opening 15 for transmission of high frequency electromagnetic energy, the opening 15 being aligned with an opening 16 in an article or member 17 disposed within the shell 11 between the closure 12 and the connector 14.

The member 17 is of a lossy material such as, for example, a cement concrete having an aggregate of particulate graphite embedded therein. High-frequency electromagnetic energy received into the opening 16 will be converted into heat by the lossy material of the member 17 and may be dissipated to the atmosphere through the outer shell 11. For a higher rate of conduction of thermal energy to the atmosphere, fins 18 may be provided on the shell 11. The opening 16 in the member 17 preferably has a tapered end portion 19 to minimize reflection of energy back from the receiving end of the member 17 which is herein designated by reference numeral 20.

To measure the power received by the member 17, a probe 21 extends into the opening 16 at a distance X from the energy-receiving end 20 of the member 17. The probe 21 may be concentrically disposed within a hollow conductor 22 extending transversely through the shell 11, a portion of the connector 14 and a portion of the member 17, and the probe 21 is connected in series with a rectifier 23 and a meter 24 to the outer shell 11. The rectifier 23 may, for example, be a germanium crystal detector which will convert the high-frequency voltage developed on the probe 21 by the electromagnetic fields within the opening 16 into a direct current so that the meter 24 may be of any conventional type of D.-C. meter.

It will be apparent that high-frequency electromagnetic energy received by the member 17 will be attenuated through the distance X by the lossy material between the receiving end 20 and the probe 21 so that the fields existing at the probe 21 will be substantially reduced. Likewise, reflections of energy arising from the probe 21 will be attenuated through the distance X. Accordingly, there will be a minimum of reflection of energy back through the guide opening 15. Reflections in wave guides are, of course, highly objectionable since they reduce the efficiency of power transmission and result in a non-uniform transmission of energy with varying frequency of transmission.

The meter 24 may, of course, be calibrated to indicate directly the power input to the dummy load. It will further be apparent that, as well as being accurate and efficient, the instrument of Figure 1 is simply and economically manufacturable.

Figure 2 illustrates another preferred embodiment of a micro wave power measuring instrument according to this invention. Referring thereto, reference numeral 30 generally designates a wave guide dummy load constructed similarly to the dummy load 10 of Figure 1, reference numerals 31, 32, 34, 35, 36, 37, 38, 39 and 40 designating structures similar to the structures 11, 12, 14, 15, 16, 17, 18, 19 and 20, respectively, as described above in connection with Figure 1.

According to this invention, one or more unions or junctions of dissimilar metals as designated by reference numerals 41, 42 and 43 are embedded in the lossy material of the member 37 and are connected to a D.-C. meter 44. The junctions 41, 42 and 43 of dissimilar metals develop potentials which are a function of the temperature thereof and, in turn, a function of the micro wave power input to the member 37 so that the meter 44 indicates the power input.

In accordance with a further feature of this invention, unions or junctions of dissimilar metals 45, 46 and 47 are disposed in the atmosphere external to the dummy load 30 and are connected in series opposed relation with the unions or junctions 41, 42 and 43 and in series with the meter 44, by means of connectors 48, 49, 50, 51, 52, 53 and 54. The conductors 48, 49, 50, 51, 52 and 53, or at least the portions thereof disposed within the dummy load 30, are preferably covered with a suitable thermal and electrical insulating material.

With a constant micro wave power input to the dummy load 30, the temperature of the lossy material, and the potential developed by the junctions 41, 42 and 43, will vary with the ambient temperature. The provision of the series opposed connected junctions 45, 46 and 47 will counteract the effect of changes in ambient temperature since the potentials developed therefrom vary with ambient temperature and oppose the potentials of the junctions 41, 42 and 43, the meter 44 indicating the potential difference between the total potential of the junctions 41, 42 and 43 and the total potential of the junctions 45, 46 and 47. An accurate instrument is, accordingly, provided.

It will be noted that the junctions 41, 42 and 43 are at a distance from the energy-receiving end 40 of the member 37 so that there will be a negligible reflection of power from the member 37 back through the guide opening 35. It will be further apparent that the power measuring instrument of Figure 2 may be simply and economically manufactured.

It will be apparent that the principles of this invention may be applied to coaxial line structures as well as the wave guide structures illustrated and to attenuators as well as dummy loads.

It will be understood that modifications and variations may be effected without departing from the spirit and scope of the novel concepts of the present invention.

I claim as my invention:

1. In a wave guide dummy load, an outer metallic shell closed at one end thereof, a wave guide connector seated in the other end of said shell and having an internal opening therethrough for transmission of high-frequency electromagnetic energy, a member of lossy material within said shell between said connector and said closed end and having an internal opening aligned with said internal opening in said connector to form a continuation thereof and extending to a point adjacent said closed end, said openings being of the same size at the junction therebetween and said opening in said member having a tapered terminal end portion so as to minimize reflection of energy transmitted into said connector, and energy receiving and measuring means located at a point along said internal opening in said member spaced a substantial distance from said connector to minimize reflection of energy transmitted into said connector.

2. In a wave guide dummy load, an outer metallic shell closed at one end thereof, a wave guide connector seated in the other end of said shell and having an internal opening therethrough for transmission of high-frequency electromagnetic energy, a member of lossy material within said shell between said connector and said closed end and having an internal opening aligned with said internal opening in said connector to form a continuation thereof and extending to a point adjacent said closed end, said openings being of the same size at the junction therebetween and said opening in said member having a tapered terminal end portion so as to minimize reflection of energy transmitted into said connector, and energy receiving and measuring means including a union of dissimilar metals embedded in said member at a point along said internal opening in said member spaced a substantial distance from said connector to minimize reflection of energy transmitted into said connector.

References Cited in the file of this patent

UNITED STATES PATENTS

| | | |
|---|---|---|
| 2,016,894 | Faus | Oct. 8, 1935 |
| 2,197,123 | King | Apr. 16, 1940 |
| 2,284,379 | Dow | May 26, 1942 |
| 2,435,597 | Moullin | Feb. 10, 1948 |
| 2,453,645 | Tiley | Nov. 4, 1948 |
| 2,464,277 | Webber | Mar. 15, 1949 |
| 2,495,268 | Leiphart | Jan. 24, 1950 |
| 2,496,541 | Johnson | Feb. 7, 1950 |
| 2,570,125 | Hoare | Oct. 2, 1951 |
| 2,646,549 | Ragan | July 21, 1953 |
| 2,648,047 | Hollingsworth | Aug. 4, 1953 |
| 2,676,307 | Anderson | Apr. 20, 1954 |
| 2,804,598 | Fano | Aug. 27, 1957 |